United States Patent
Battiato et al.

(10) Patent No.: US 10,885,075 B2
(45) Date of Patent: Jan. 5, 2021

(54) MAINTAINING TEMPLATES FOR INDEX CREATION AND MODIFICATION

(71) Applicant: salesforce.com, inc., San Francisco, CA (US)

(72) Inventors: Nicolas Hernan Battiato, Buenos Aires (AR); Diego Martin Rubinstein, Buenos Aires (AR)

(73) Assignee: salesforce.com, inc., San Francisco, CA (US)

(*) Notice: Subject to any disclaimer, the term of this patent is extended or adjusted under 35 U.S.C. 154(b) by 185 days.

(21) Appl. No.: 16/231,494

(22) Filed: Dec. 22, 2018

(65) Prior Publication Data
US 2020/0201894 A1    Jun. 25, 2020

(51) Int. Cl.
G06F 16/31    (2019.01)
G06F 16/33    (2019.01)
G06F 40/186   (2020.01)

(52) U.S. Cl.
CPC ........ G06F 16/328 (2019.01); G06F 16/3331 (2019.01); G06F 40/186 (2020.01)

(58) Field of Classification Search
CPC ... G06F 16/328; G06F 17/3331; G06F 40/186
USPC ........................................................ 707/711
See application file for complete search history.

(56) References Cited

U.S. PATENT DOCUMENTS

| | | | | |
|---|---|---|---|---|
| 9,141,853 B1* | 9/2015 | Rubio | ................ | G06K 9/00469 |
| 9,152,728 B2* | 10/2015 | Schultz | ............... | G06F 16/9566 |
| 9,268,763 B1* | 2/2016 | Esho | ........................ | G06F 16/93 |
| 2004/0049445 A1* | 3/2004 | Kishore | .................. | G06Q 40/02 705/37 |
| 2009/0327321 A1* | 12/2009 | McCormack | ......... | G06F 40/186 |
| 2012/0185515 A1* | 7/2012 | Ferrel | ..................... | G06F 16/25 707/802 |
| 2015/0127659 A1* | 5/2015 | Madhani | ................. | G06F 16/24 707/748 |
| 2018/0268504 A1* | 9/2018 | Paolini-Subramanya | ................... | G06Q 20/3823 |

OTHER PUBLICATIONS

Zhao, Luyin, et al., "Generating XML Schemas for DICOM Structured Reporting Templates", Journal of the American Medical Informatics Association, vol. 12, No. 1, Jan./Feb. 2005, pp. 72-83.*
Chowdhury, Gobinda G., "Template Mining for Information Extraction from Digital Documents", Library Trends, vol. 48, No. 1, © 1999, The Board of Trustees, University of Illinois, pp. 182-208.*

* cited by examiner

*Primary Examiner* — Robert Stevens
(74) *Attorney, Agent, or Firm* — Fenwick & West LLP

(57) ABSTRACT

A method and system generates an index for efficient processing of search queries. The system receives documents. Each document is of a document type. The system identifies a template configured for the document type. The template comprises fields arranged in a template structure. The system determines whether the template structure matches the document structure. If the template structure does not match the document structure, the system updates the template by matching the template structure to the document structure. The system generates an index from the updated template with the document data. The system stores the index in an index database. The system uses the index for efficient execution of search queries.

20 Claims, 6 Drawing Sheets

| Document<br>320 | Template<br>310 |
|---|---|
| {<br>  "order": 0,    ⟋ 324<br>  "version": 1, ⟋     ⟋ 322<br>  "template": "*-person-*",<br>  "settings": {<br>    "index": {<br>      "number_of_shards": "5"<br>    }<br>  },<br>  "mappings": {<br>    "person": {<br>      "_all": {<br>        "enabled": false<br>      },<br>      "properties": {<br>        "firstName": {<br>          "type": "keyword"<br>        },<br>        "lastName": {<br>          "type": "keyword"<br>        },<br>        "id": {<br>          "type": "keyword"<br>        }<br>      }<br>    }<br>  }<br>} | {<br>  "order": 0,    ⟋ 314<br>  "version": 1, ⟋     ⟋ 312<br>  "template": "*-person-*",<br>  "settings": {<br>    "index": {<br>      "number_of_shards": "5"<br>    }<br>  },<br>  "mappings": {<br>    "person": {<br>      "_all": {<br>        "enabled": false<br>      },<br>      "properties": {<br>        "firstName": {<br>          "type": "keyword"<br>        },<br>        "lastName": {<br>          "type": "keyword"<br>        },<br>        "id": {<br>          "type": "keyword"<br>        }<br>      }<br>    }<br>  }<br>} |

Template 410

```
{
  "order": 0,
  "version": 1,                          ← 414
  "template": "*-person-*",
  "settings": {
    "index": {
      "number_of_shards": "5"
    }
  },
  "mappings": {
    "person": {
      "_all": {
        "enabled": false
      },
      "properties": {
        "firstName": {
          "type": "keyword"
        },
        "lastName": {
          "type": "keyword"
        },
        "id": {
          "type": "keyword"
        }
      }
    }
  }
}
```

Document 420

```
{
  "order": 0,
  "version": 1,                          ← 424
  "template": "*-person-*",
  "settings": {
    "index": {
      "number_of_shards": "5"
    }
  },
  "mappings": {
    "person": {
      "_all": {
        "enabled": false
      },
      "properties": {
        "firstName": {
          "type": "keyword"
        },
        "lastName": {
          "type": "keyword"
        },
        "id": {
          "type": "keyword"
        },
        "idType": {                      ← 422
          "type": "keyword"
        }
      }
    }
  }
}
```

Document 430

```
{
  "order": 0,
  "version": 2,                          ← 434
  "template": "*-person-*",
  "settings": {
    "index": {
      "number_of_shards": "5"
    }
  },
  "mappings": {
    "person": {
      "_all": {
        "enabled": false
      },
      "properties": {
        "firstName": {
          "type": "keyword"
        },
        "lastName": {
          "type": "keyword"
        },
        "id": {
          "type": "keyword"
        },
        "idType": {
          "type": "keyword"
        }
      }
    }
  }
}
```

MAINTAINING TEMPLATES FOR INDEX CREATION AND MODIFICATION

BACKGROUND

This present disclosure generally relates to online systems operating as search engines and more particularly for template based indexing of documents for efficient text searching.

Conventional online systems operating as search engines store documents and process text-search queries. For example, a website storing different types of documents may provide text-search capability through the documents. Similarly, an online system may access and store documents obtained from several different websites and allow searches to be performed across the data of multiple websites. An example of a When receiving a text-search query, the conventional online system searches through the stored documents for the requested data in the search query. Many conventional online systems encounter challenges when stored data is structured differently, thereby, increasing difficulty in searching across the different structures. Although some conventional online systems attempt to surmount this challenge through synchronization of data in similar structures, the process of conforming previously stored data may require extensive user effort in propagating structural changes.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 3 illustrates an example of a document with a document structure that matches to a template structure of a template, according to an embodiment.

FIG. 4 illustrates an example of a document with a document structure that does not match a template structure of a template, according to an embodiment.

Figure 1:
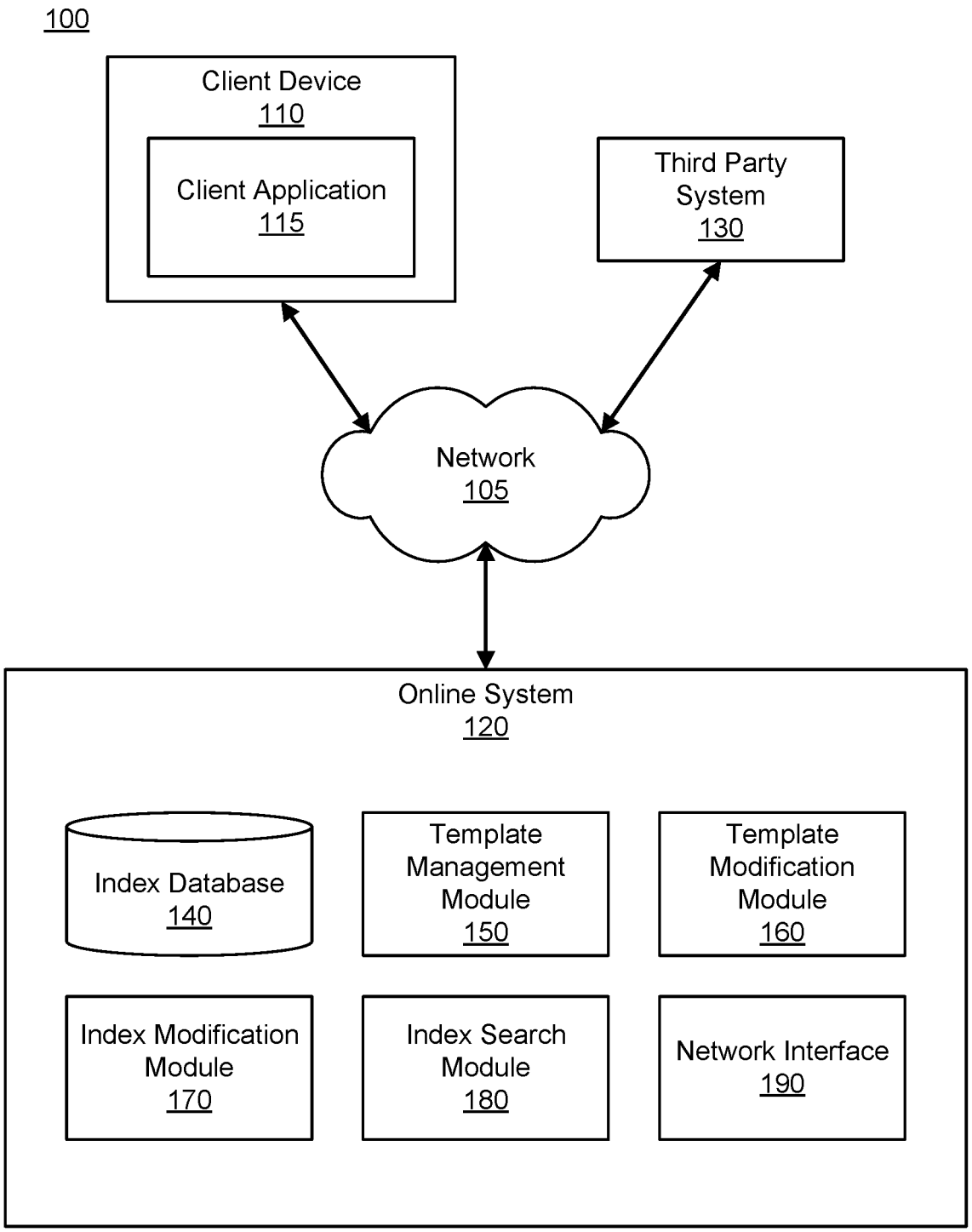
FIG. 1 illustrates a system environment in which an online system operates, according to some embodiments.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

An online system operating as a search engine stores documents for retrieval in subsequent search queries. The online system maintains templates, each template corresponding to a document type, wherein each template has one or more fields structured according to a template structure. When the online system receives a document with an associated document type, the online system identifies a template corresponding to the document type of the received document. The online system determines whether the stored version of template structure matches the document structure. If so, the online system may use the current template. If not, the online system updates the template such that the template structure matches the document structure, with the various fields now structured in the matched template structure. Additionally, the online system may increase a version of the template each update iteration. The online system generates an index for the document with the template (e.g., the current template or the updated template) wherein the index has all fields present in the template arranged according to the template structure (e.g., the template structure from the current template or the matched template structure from the updated template). The online system populates the index with the data from the received document. Indices are then stored in an index database for retrieval in subsequent search queries. This dynamic method of updating the templates ensure being able to propagate values from all fields in the document into an index.

In additional embodiments, the online system may synchronize previously stored indices after an update to a corresponding template occurs. When a template for a document type is updated, the online system may retrieve previously generated indices using the template. The online system may generate a new index with the updated template and propagate values from the old index into the new index. Additionally, the online system may set an increased version value for the new index. Optionally, the online system may delete the old index. With the new index, the online system stores the new index in the index database. Synchronization of indices with the most up to date version of the template improves efficiency when searching through all indices given that all indices would have a uniform structure.

In additional embodiments, the online system may receive updated documents. If an update is needed to the template corresponding to the document type, then the online system updates the template. The online system generates a new index with the updated template and stores the new index. If an update to the template is not needed, the online system evaluates whether a time update is needed as the old index was modified over a time threshold ago. If a time update is needed, then the online system generates a new index with the current template, wherein the new index has a new timestamp. If no time update is needed, then the online system may modify the old index by adjusting values in the old index according to the updated document. The online system may choose to store old or new indices created for the updated document in the index database. Updating, whether updating the template and/or updating based on timing ensures that indices are frequently updated.

Definitions

A computing device or computer can be any conventional computer system executing, for example, a Microsoft™ Windows™-compatible operating system (OS), Apple™ OS X, and/or a Linux distribution. A computing device can also be a hand-held device having computer functionality, such as a personal digital assistant (PDA), mobile telephone, etc. A computing device generally comprises one or more processors and one or more computer-readable non-transitory storage mediums with encoded instructions that, when executed by the processors, cause the processors to accomplish one or more processes.

A search engine is a functional description of a system that is capable of storing data and performing search operations on the stored data.

A search query is a request including one or more search parameters that define the search of data to be performed by the online system. When the online system receives a search query, the online system performs the search according to the search query and returns searched data matching search parameters in the search query.

An object is a computer-readable entity that stores data. For example, an object may be formatted in a markup language, such that each field represents a tag of the markup language document. Examples of markup language document include XML (extensible markup language documents), HTML (hypertext markup language), WML (wireless markup language), and so on. In other embodiments, objects may also be formatted in JavaScript Object Notation (JSON) including tuples of data, wherein each tuple has a field name and a value, also referred to as a field-value pair. A field may be formatted in a string. A value may be formatted in a string, an integer, a Boolean, or any other data type. Although various embodiments described herein are based on JSON documents, the techniques disclosed are applicable to any markup language document format.

A document is an object comprising data. A document may store data as tuples, such as field-value pairs. A document has data arranged in a document structure which may be a nested hierarchy structure. A document type is a label for each document that aids in grouping similar documents together.

An index is an object comprising data and stored in an index database. An index may also store data as tuples, such as field-value pairs. An index has an index name and a document type. In some embodiments, an index also has a date that may specify a date of generation, a date of modification, and/or a date of storage in the index database. In some embodiments, an index is generated from a template and may carry a template's version number. Additionally, the index generated from the template has data arranged in a template structure. A set is a group of indices corresponding to a document.

A template is an object comprising fields arranged in a template structure. The template structure may be a nested hierarchy of fields. Each template may be labeled with a version number and may additionally have a field with the version number. In a template, the fields do not have associated values.

System Environment

FIG. 1 illustrates a system environment 100 in which an online system 130 operates, according to some embodiments. As shown in FIG. 1, the system environment 100 includes one or more client devices 110, a third party system 120, an online system 130, and a network 105. Other embodiments may use more or fewer or different systems than those illustrated in FIG. 1. Functions of various modules and systems described herein can be implemented by other modules and/or systems than those described herein.

Interactions between any pairing of the client device 110, the third party system 120, and the online system 130 are performed via the network 105. In one embodiment, the network uses standard communications technologies and/or protocols, e.g., via the Internet. In another embodiment, various devices, and systems can use custom and/or dedicated data communications technologies instead of, or in addition to, the ones described above. The techniques disclosed herein can be used with any type of communication technology, so long as the communication technology supports receiving by the online system 130 of requests from a sender, for example, a client device 110 and transmitting of results obtained by processing the request to the sender.

A client device 110 is used by one or more users to interact with the online system 130. A client device 110 may be a general computing device. A user interacts with the online system 130 using the client device 110 executing client application 115. An example of a client application 115 is a browser application. In an embodiment, the client application 115 interacts with the online system 130 using HyperText Transfer Protocol (HTTP) requests sent over network 150.

The third party system 120 is an external system that communicates data to and from the online system 130. The third party system 120 may comprise one or more general computing devices. The third party system 120, in relation to the online system 130, may be a tenant storing data that may be only accessed by devices or systems with permission granted by the tenant. The third party system 120 provides the online system 130 with data for storage and may additionally provide search queries to the online system 130 for retrieval of stored data. Further, each tenant may be an enterprise as described herein. As an example, one tenant might be a company that employs a sales team where each salesperson uses a client device 110 to manage their sales process. Thus, third party system 120 may provide data such as contact data, leads data, customer follow-up data, performance data, goals, and progress data, etc., all applicable to that user's personal sales process. In another example, a tenant may be a library that collects documents for storage and searching through the online system 130.

The online system 130 operates as a search engine, storing and retrieving data. The online system 130 generates indices for documents. The online system 130 stores the generated indices in an index database. The online system 130 further stores templates which are used to generate indices for documents. The online system 130 may update templates. With the updated documents, the online system 130 may further synchronize indices previously generated with an outdated template by creating a new index with the updated template and propagating data from the old index into the new index. The online system 130 also receives search queries from external systems, e.g., the client device 110 and/or the third party system 120. The online system 130 searches through the index database using search parameters to find one or more indices as a search result to the search query. In general, search results comprise indices retrieved from the index database.

Online System Architecture

The online system 130 operates as a search engine, storing and retrieving data. The online system 130 may comprise one or more general computing devices. In some embodiments, the online system 130 has an index database 140, a template management module 150, a template modification module 160, an index modification module 170, an index search module 180, and a network interface 190. In other embodiments, the online system 130 may contain additional and/or fewer components than those listed herein. In other embodiments, functions of various components may be variably distributed among the components in the online system 130.

The index database 140 stores indices used by the online system 120. The index database 140 may sort indices in the index database according to document type. Furthermore, the index database 140 may group sets of indices together.

With a multi-tenant system, data for multiple tenants may be stored in the same index database 140; however, tenant data typically is arranged so that data of one tenant is kept logically separate from that of other tenants so that one tenant does not have access to another tenant's data, unless such data is expressly shared. In certain embodiments, the online system 130 implements applications. For example, the online system 130 may provide tenant access to multiple hosted (standard and custom) applications. According to one embodiment, the online system 130 is configured to provide webpages, forms, applications, data and media content to client devices 110. The online system 130 provides security mechanisms to keep each tenant's data separate unless the data is shared.

A multi-tenant system may implement security protocols and access controls that keep data, applications, and application use separate for different tenants. In addition to user-specific data and tenant-specific data, the online system 130 may maintain system level data usable by multiple tenants or other data. Such system level data may include industry reports, news, postings, and the like that are sharable among tenants. It is transparent to customers that their data may be stored in a database that is shared with other customers. Accordingly, in a multi-tenant system, various elements of hardware and software of the system may be shared by one or more customers. For example, the online system 130 may execute an application server that simultaneously processes requests for a number of customers using the same components of the online system 130.

The template management module 150 determines whether templates are outdated and may need to be updated. The template management module 150 may also store the templates. When a document is received by the online system 130, the template management module 150 searches among available templates for a template for the document type of the received document. The template management module 150 may determine that there does not currently exist a template for that document type. If no template exists, the template management module 150 may generate a template from the received document by copying fields from the document into the newly created template but without copying over the values from the document. The template management module 150 may additionally label the template with a version number that starts at an initial number for newly created templates.

If a template does exist, the template management module 150 may compare the received document to the existing template to determine whether the template needs to be updated prior to propagating the data from the document in an index. In one embodiment, the template management module 150 determines whether the template structure matches that of the document structure. If the template structure does not match, then the template management module 150 further determines whether the template has fewer fields than the document. If the template has fewer fields, then the template management module 150 may deem the template in need of an update. The template management module 150 may provide the template modification module 160 with the template determined to be in need of an update. The template management module 150 may receive back the updated template. The template management module 150 may then provide the appropriate template—whether a pre-existing template, a newly created template, or a recently updated template—and the document to the index modification module 170 for generating the index. Further description of the template management module 150 will follow in conjunction with FIGS. 2-4 and 6.

The template modification module 160 modifies existing templates. The template modification module 160 receives a template to be updated along with a document as a model for the update. The template modification module 160 may check the document and accordingly a document version number compared to a template version number. If the document version number is equal to the template version number, then the template modification module 160 increases the document version number prior to modification of the template. Once adjusted such that the document version number is larger than the template version number, the template modification module 160 compares the document structure to the template structure. The template modification module 160 updates the template by matching the template structure to the document structure, copying over any added or moved fields in the document structure. The template modification module 160 also increases the template version number with the updated template. The template modification module 160 may provide the updated template back to the template management module 150 or to an index modification module 170 for generation of indices with the updated template. Further description of the template modification module 160 will follow in conjunction with FIGS. 2 and 6.

The index modification module 170 generates and/or modifies indices for use by the online system 130. In some embodiments, the index modification module 170 uses a template to generate an index for an object, e.g., a document or an old index. The index modification module 170 may receive the appropriate template from another component of the online system 120, e.g., the template management module 150 and/or the template modification module 160. The appropriate template received by the index modification module 170 has a number of fields greater than or equal to the object. For example, the appropriate template has 5 fields compared to the object that has 5 or less fields. With the appropriate template, the index modification module 170 generates an index and propagates data from the document into the generated index. In generating the index, the index modification module 170 may generate an index name by any combination of the document name, the template name, the template version number, and the date (e.g., any combination of time, day, month, and year). The index modification module 170 may store the newly generated index in the index database 140.

In other embodiments, the index modification module 170 modifies existing indices. The index modification module 170 uses an updated document for modifying an existing index. The index modification module 170 may retrieve the existing index in the index database and modify the index according to the updated document which may imply changing of one or more fields and/or the index name. The index modification module 170 may return the modified index to the index database 140. Further description of the index modification module 170 will follow in conjunction with FIGS. 2, 5, and 6.

The index search module 180 searches for indices according to search queries. A search query specifies search parameters, e.g., a set of indices, a document type, a date, a version number, one or more values (e.g., terms, keywords, etc.), one or more logical operators specifying relations between the values, additional filters like size, scope, ordering, and so on. The index search module 180 processes the search queries and returns search results comprising one or more indices (or sets of indices) that match the search parameters specified in the search query. The index search module 180 may additionally rank the search results based on a measure of likelihood that the user is interested in each search result. The index search module 180 provides the search results to the external system (e.g., the client device 110 or the third party system 120) where the search query originated from.

The network interface 190 manages transfer of data to and/or from the network 105. The network interface 190 may establish connections between the online system 130 and other external systems via the network 105. While doing so, the network interface 190 may verify security protocols in establishing connections with other external systems. In embodiment where the online system 130 manages a multi-tenant system, the network interface 190 may verify accessibility settings of external systems attempting to establish a connection with the online system 130 for data partitioned for any one of the tenants.

Index Generation and/or Modification

Figure 2:
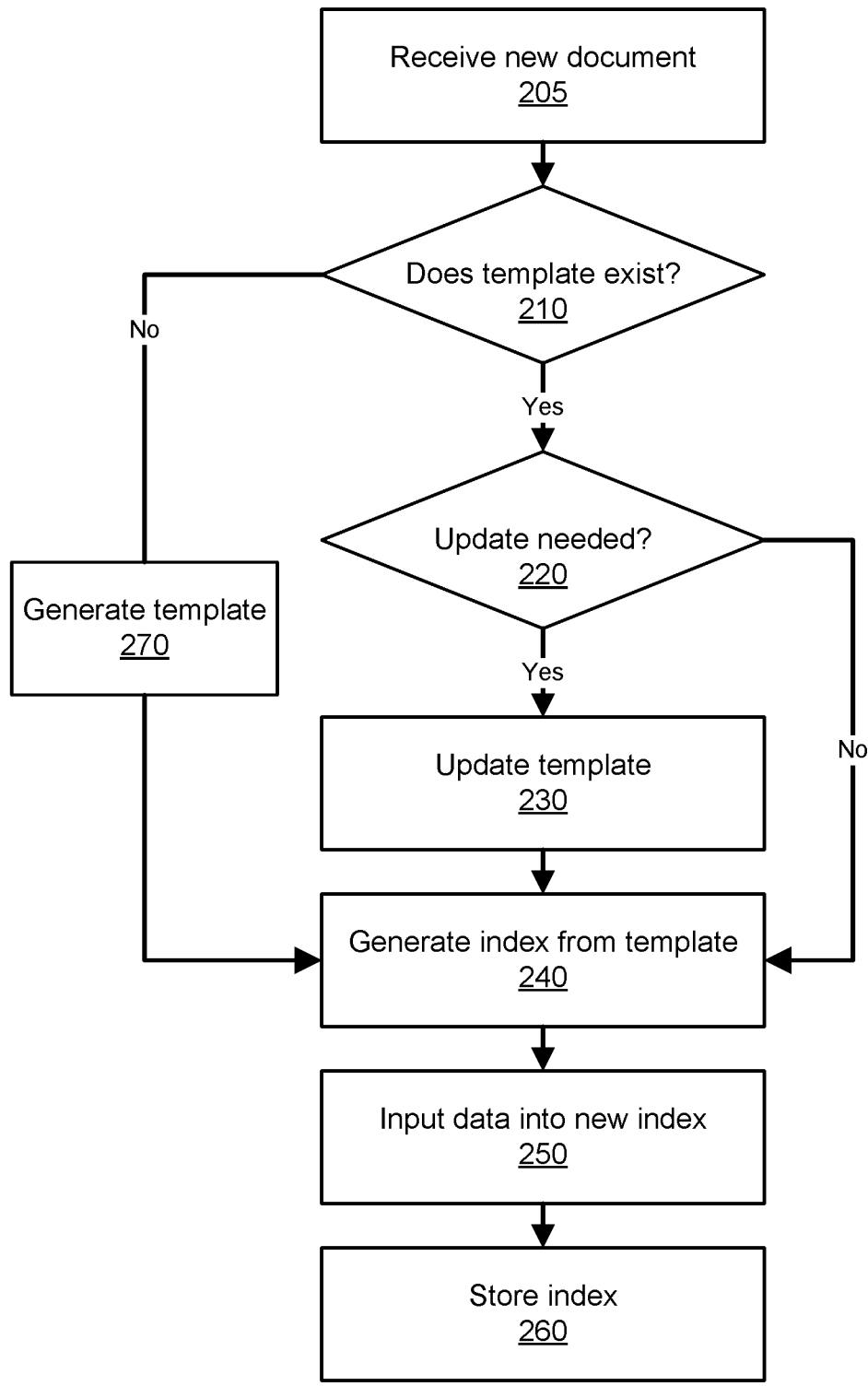
FIG. 2 illustrates a flowchart of a process of generating an index with a new document, according to some embodiments.

FIG. 2 illustrates a flowchart of a process 200 of generating an index with a new document, according to some embodiments. In one or more embodiments, the online system 130 along with various components described above in FIG. 1 accomplish various steps of the process 200.

The online system 130 receives 205 a new document. The new document may be received from any external system, e.g., the client device 110 or the third party system 130. The new document has document data and a document type. Additionally, the new document may comprise any combination of a document name, a document version number, any other document specific characteristics, etc. In some embodiments, the network interface 190 of the online system 130 receives the new document from an external system via the network 105.

The online system 130 determines 210 whether a template exists that is appropriate for the new document. The online system 130 checks whether a template exists for the document type of the document. For example, the document type is "web article", and the online system 130 checks whether there is an existing template for the document type, "web article". In some embodiments, the template management module 150 of the online system 130 determines 210 whether a template exists that is appropriate for the new document.

If a template for the document type is found at step 210, the online system 130 determines 220 whether an update to the template is needed. The online system 130 compares the template structure and the document structure. If the template structure is different that the document structure either because there are varying number of fields or because the fields are variably nested in the structure, then the online system 130 may determine that the template structure does not match the document structure. In cases where the template structure has more fields than the document structure, the online system 130 may further determine whether fields that overlap between the document and the template are similarly arranged. If so, then the online system 130 may determine that the template remains viable for use in generating an index for the document. In other words, all fields in the document may be propagated over to fields in an index created by the template. However, if the online system 130 determines that the document structure has more fields than the template structure, the online system 130 may determine that the template is a candidate for an update. In some embodiments, the online system 130 further checks the document version number with the template version number. In instances with templates that may be candidates for updates, if the document version number is equal to or lesser than the template version number, the online system 130 modifies the document version number such that the document version number is greater than the template version number, e.g., increasing the document version number until it is one greater than the template version number. In some embodiments, the template management module 150 of the online system 130 determines 220 whether an update to the template is needed.

Referring now to FIGS. 3 & 4, examples of comparisons between a document and a template are shown. In each pairing, the online system 130 determines 210 that a template exists that is appropriate for the new document by finding a template for the document type of the document.

FIG. 3 illustrates an example of a document 320 with a document structure that matches to a template structure of a template 310, according to an embodiment. The online system 130 finds a template exists for the document type of the document. In this example, the document has a document type field 322 with the value of "*-person-*", the online system 130 finds the template with a document type field 312 with the value of "*-person-*". The online system 130 determines 220 whether an update to the template is needed. The online system 130 compares the template structure and the document structure. In comparing the two, the online system 130 determines that the template structure matches that of the document structure—both in number of fields and arrangement of fields—such that the online system 130 may deem the template as not being a candidate for an update. The online system 130 may further check that a document version number field 324 has a value greater than or equal to a value in a template version number field 314.

FIG. 4 illustrates an example of a document 420 with a document structure that does not match a template structure of a template 410, according to an embodiment. Similar to the example in FIG. 3, the online system 130 finds a template with a document type of the document. The online system 130 determines 220 that an update to the template is needed. The online system 130 compares the template structure to the document structure. In comparing the two, the online system 130 determines that the document structure does not match the template structure, specifically, there are additional fields 422 in the document structure compared to the template structure. As described above, the online system 130 deems the template 410 as a candidate for an update. In some embodiments, the online system 130 proceeds with updating the template. In other embodiments, the online system 130 further checks a document version number 424 with a template version number 414. In this example, the online system 130 determines that the document version number 424, "1", is equal to the template version number 414, "1". The online system 130 modifies the document 420 resulting in document 430 with the document version number 434 increased to be greater than the template version number 414, specifically "2" being one greater than the template version number 414. The online system 130 may proceed with the document 430 for updating the template 410.

Referring back to FIG. 2, if the online system 130 determines a need for a template update at step 220, the online system 130 updates 230 the template. The online system 130 at step 230 may check the document and accordingly a document version number compared to a template version number. The online system 130 updates the template by matching the template structure to the document structure, copying over any added or moved fields in the document structure. The online system 130 also increases the template version number with the updated template. In some embodiments, the template modification module 160 of the online system 130 updates 230 the template.

If the online system 130 determines there is no need for a template update at step 220, then the online system 130 may proceed with the template to generating 240 an index with the existing template.

Back at step 210, if the online system 130 does not find a template that is appropriate for the new document, the online system 130 generates 270 a new template. The online system 130 may generate the new template from the new document by copying over fields from the new document into the newly created template but without copying over the values for the various fields. In doing so, the new template has the same fields as the new document arranged in the same structure, i.e., the template structure matches the document structure. The online system 130 may store the newly generated template for use in generating subsequent indices for documents with similar document type as the new document. In some embodiments, the template management module 150 generates 270 the new template.

With the appropriate template, the online system 130 generates 240 an index with the template. The appropriate template may be a newly generated template via step 270, an existing template without need for an update via step 220, or an existing template updated via step 230. In some embodiments, the appropriate template has at least the same number of fields as the document with the fields arranged similarly in the template as in the document. Additionally, the appropriate template has a template version number that is greater than or equal to the document version number. The online system 130 generates a new index with the template by copying over fields from the template into the new index. Furthermore, the online system 130 may generate an index name for the new index. The index name has any combination of the document type, a template version number, and a date (e.g., any combination of year, month, day, time, etc.). The index name may be obtained by concatenating various strings corresponding to the document type, the template version number, and the date. For example, the index name may be "082018-personIndex-1" wherein the portion "082018" refers to August 2018 (e.g., when the index was generated), the portion "-personIndex-" refers to the document type or template used, and the portion "1" refers to the template version number. In some embodiments, the index name is dynamically generated when the index is also generated. In some embodiments, the index modification module 170 of the online system 130 generates 240 the index.

With the new index, the online system 130 inputs 250 data into the new index. The online system 130 propagates values of fields from the document into associated fields in the new index. For example, the document has a field named "street address" with the value of "123 1$^{st}$ Street" which is then propagated by the online system 130 into the index under the field named "street address" such that the field named "street address" in the index also has the value "123 1$^{st}$ Street". In some embodiments, the document has fewer field-value pairs than the index such that the index after data propagation has one or more fields without values. In some embodiments, the index modification module 170 of the online system 130 inputs 250 the data into the new index.

The online system 130 stores 260 the index. The online system 130 may store the index for the new document, e.g., in the index database 140 of the online system 130. The online system 130 may additionally store indices derived from the same template for a document type together. In some embodiments, the index modification module 170 of the online system 130 stores 260 the index, e.g., in the index database 140.

Figure 5:
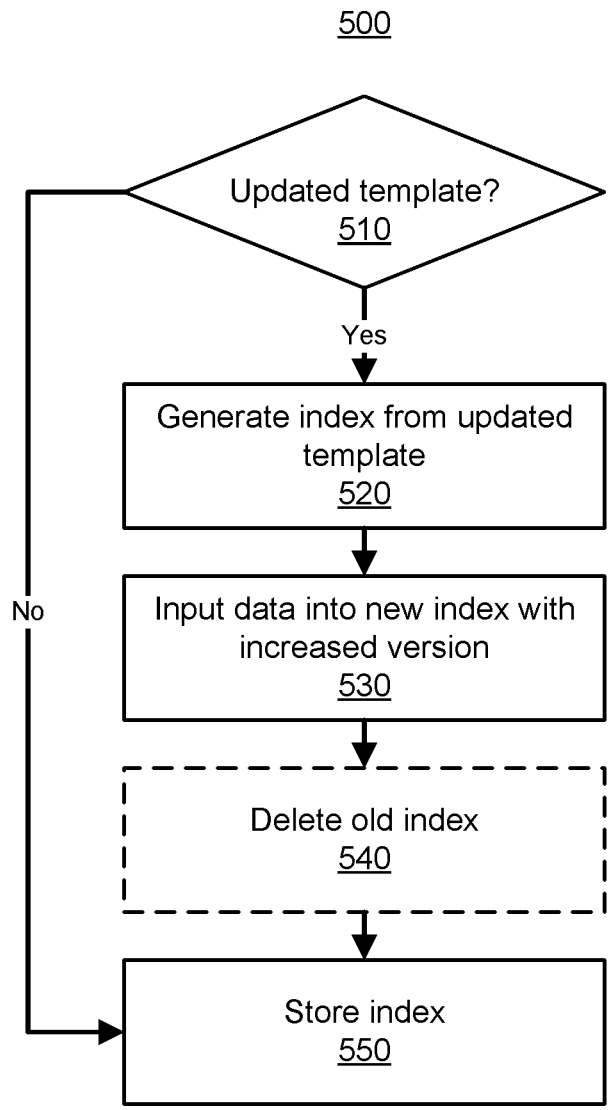
FIG. 5 illustrates a flowchart of a process of synchronizing indices with an updated template, according to some embodiments.

FIG. 5 illustrates a flowchart of a process 500 of synchronizing indices with an updated template, according to some embodiments. Once a template is updated, there may be one or more indices in the online system 130 that were generated with the outdated version of the template. To improve the online system 130 efficiency in searching indices, the online system 130 synchronizes indices with the updated template, thereby, allowing the online system 130 to search across indices synchronized with the most updated template. The process 500 may be iterated with previously stored indices in the online system 130 (e.g., in the index database 140). In one or more embodiments, the online system 130 along with various components described above in FIG. 1 accomplish various steps of the process 500. The online system 130 retrieves a previously stored index. In some embodiments where the indices are named using a combination of a document type, a template version number, and a date, the online system 130 may retrieve indices all created with the template for the same document type.

The online system 130 determines 510 whether there is an updated template for a retrieved index. In some embodiments, from the name of the index, the online system 130 may retrieve the template used to create the index. The online system 130 may compare the template version number in the index name to the template. For example, if the index was named "082018-personIndex-1" when generated by the template for the document type "-personIndex-" of template version number "1", then the online system 130 checks whether the template for the document type "-personIndex-" has a template version number greater than that indicated in the index name. If the template version number of the template is greater, then the online system 130 confirms that the template had been updated since the generation of the retrieved index. If the template version number is equal, then the online system 130 stores 550 the index without any modifications. In some embodiments, the index modification module 170 of the online system 130 determines 510 whether there is an updated template for a retrieved index.

If the online system 130 confirms that the template had been updated since the generation of the retrieved index, the online system 130 generates 520 a new index with the updated template. Similar to the step 240 of the process 200, the online system 130 generates a new index with the updated template. This may include copying fields arranged in the template structure into the new index and/or generating an index name for the new index (according to similar principles described above). In some embodiments, the new index will have an index name that reflects the template version number belonging to the updated template. For example, the retrieved index has an index name reflecting a template version number of "2" when the index was generated by the outdated template, and now the new index has an index name reflecting a template version number of "3" when the new index was generated by the updated template. In some embodiments, the index modification module 170 of the online system 130 generates 520 the new index with the updated template.

The online system 130 inputs 530 data into the new index with the increased template version number. The online system 130 propagates values from the old index into the new index. In some embodiments, the new index may have more fields than the old index and/or may have fields that are variably arranged compared to the old index. In either case, the values of the fields from the old index are propagated into the associated fields in the new index. In some embodiments, the index modification module 170 of the online system 130 inputs 530 the data into the new index with the increased template version number.

At this point in the process 500, the online system 130 may optionally choose to delete 540 the old index. The online system 130 may choose to keep the new index but not the old index. One benefit of deleting 540 the old index is decreasing storage requirements of extraneous indices. In some embodiments, the index modification module 170 of the online system 130 may optionally choose to delete 540 the old index.

The online system 130 stores 550 the index. The online system 130, depending on whether the old index was deleted at step 540, may store the new index and optionally the old index. When choosing to store the old index as well, the online system 130 may store the old index and the new index in the same set to keep the two indices together as the two indices share similar data from the same originating document.

Figure 6:
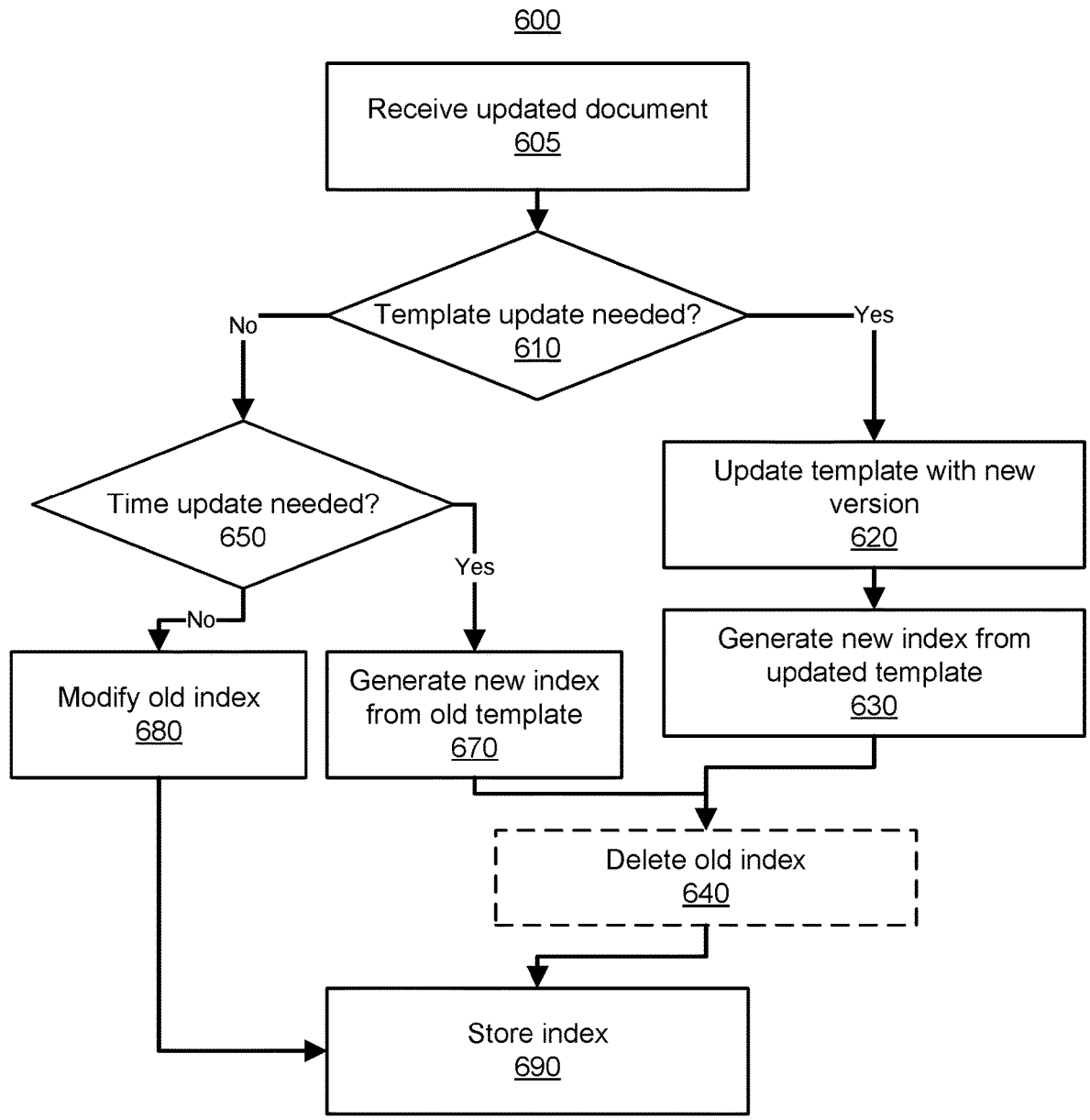
FIG. 6 illustrates a flowchart of a process of storing an updated document, according to some embodiments.

FIG. 6 illustrates a flowchart of a process 600 of storing an updated document, according to some embodiments. In one or more embodiments, the online system 130 along with various components described above in FIG. 1 accomplish various steps of the process 600.

The online system 130 receives 605 an updated document. The updated document may be requested by the online system 130 from an external system. The online system 130 may send a request for an updated document with a certain frequency, e.g., every month. In any case, the online system 130 receives the updated document with one or more changes which may include changed values, changed document structure, changed fields, etc. The updated document may be an update to a document previously received by the online system 130 with which the online system 130 may have accomplished the process 200 of FIG. 2 to generate an index for the document when previously received. With the updated document, the online system 130 retrieves the template according to the document type of the updated document. In some embodiments, the network interface 190 of the online system 130 receives 605 the updated document.

The online system 130 determines 610 whether an update to the template is needed. Along similar principles described above in step 220 of the process 200 in FIG. 2, the online system 130 may check the updated document against a template according to the document type. If the online system 130 determines a difference between the document structure of the updated document and the template structure, the online system 130 may determine the template to be a candidate for an update. The online system 130 may further check the document version number in the updated document with the template version number. The online system 130 may modify the document version number to be greater than the template version number if there is a difference in the structures. In some embodiments, the template management module 150 of the online system 130 determines 610 whether the update to the template is needed.

If the online system 130 determines an update is needed to the template at step 610, then the online system 130 updates 620 the template. The online system 130 may update 620 the template in a similar manner described in step 230 of the process 200 in FIG. 2. The online system 130 updates the template by matching the template structure to the document structure of the updated document, copying over any added or moved fields in the document structure. The online system 130 also increases the template version number with the updated template. In some embodiments, the template modification module 160 of the online system 130 updates 620 the template.

The online system 130 generates 630 a new index with the updated template. The online system 130 may generate 630 the new index with the updated template and data from the updated document in a similar manner described in step 240 of the process 200 in FIG. 2. In some embodiments, the index modification module 160 of the online system 130 updates 620 the template. The online system 130 may optionally choose to delete 640 the old index after generating the new index with the updated template and data from the updated document. In cases where both indices, old and new, are stored, the online system 130 may store the indices in the same set for the same document.

If the online system 130 determines that no update of the template is needed at step 610, then the online system 130 determines 650 whether a time update is needed for the stored index. The online system 130 retrieves a previously generated and/or modified index for the same document. The online system 130 checks the index, e.g., via the index name, for a date. The date may correspond to generation or modification of the old index. For example, the old index's name includes the date of "012016" referring to January 2016. The online system 130 checks the current date against the old index's date to check whether the current date is above a threshold differential from the old index's date. For example, the threshold differential may be 1 month, such that if the current date is March 2016 with the old index date of January 2016, then the online system 130 may determine a need for a time update.

If the online system 130 determines a need for a time update at step 650, then the online system 130 generates 670 a new index with the existing template. The online system 130 may generate the new index along with an index name for the new index. The index name for the new index may include a current date corresponding to generation of the new index. For example, the old index may include "012016" in the index name referring to January 2016; whereas, the new index may include "032016" in the index name referring to March 2016 when the new index was generated. The online system 130 propagates data from the updated document into the new index. In some embodiments, the index modification module 170 of the online system 130 generates 670 the new index with the existing template. The online system 130 may optionally choose to delete 640 the old index after generating the new index with the updated template and data from the updated document. In cases where both indices, old and new, are stored, the online system 130 may store the indices in the same set for the same document.

If the online system 130 determines there is no need for a time update at step 650, then the online system 130 modifies 680 the old index. The online system 130 may adjust one or more values of one or more fields in the old index. In some embodiments, the index modification module 170 of the online system 130 modifies 680 the old index.

After generation of any new indices or modification of an old index, the online system 130 stores 690 one or more of the indices, e.g., in the index database 140 of the online system 130. In some embodiments, the online system 130 may store related indices in the same set. In other words, indices with data originating from the same document—previously retrieved or the updated document—may be stored together in the same set.

Additional Configurations

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, at an online system, a document of a document type comprising document data in a document structure;
   identifying a template in a template database that is configured for the document type, the template comprising one or more fields arranged in a template structure;
   determining whether the template structure matches the document structure;
   responsive to determining that the template structure does not match the document structure, updating the template by matching the template structure to the document structure;
   generating an index from the updated template with the document data, wherein the index comprises the document data arranged in the matched template structure; and
   storing the index in an index database.

2. The method of claim 1, wherein the updated template comprises the fields arranged in the matched template structure.

3. The method of claim 1, the updating the template including increasing a template version number.

4. The method of claim 3, further comprising:
   generating an index name for the index, the index name comprising a combination of a date, the document type, the template version number.

5. The method of claim 1, the updating the template by matching the template structure to the document structure comprising any combination of:
   adding one or more additional fields in the document structure to the template structure; and
   moving one or more fields in the template structure to match the document structure.

6. The method of claim 1, wherein the document data is formatted in field-value pairs, the generating the index from the updated template with the document data comprising:
   generating the index by copying into the index the fields from the updated template arranged in the matched template structure; and
   inputting values from the document data into associated fields in the index.

7. The method of claim 1, further comprising:
responsive to updating the template, identifying one or more additional indices in the index database that match the document type, each of the additional indices comprising index data arranged in the template structure;
for each of the additional indices, generating a subsequent index from the additional index with the updated template, wherein the subsequent index has the index data from the additional index arranged in the matched template structure from the updated template; and
storing the subsequent indices in the index database.

8. The method of claim 7, further comprising:
deleting the additional indices from the index database upon storing of the subsequent indices.

9. A computer-readable non-transitory storage medium with encoded instructions that, when executed by a processor, cause the processor to accomplish steps of:
receiving, by an online system, a document of a document type comprising document data in a document structure;
identifying a template in a template database that is configured for the document type, the template comprising one or more fields arranged in a template structure;
determining whether the template structure matches the document structure;
responsive to determining that the template structure does not match the document structure, updating the template by matching the template structure to the document structure;
generating an index from the updated template with the document data, wherein the index comprises the document data arranged in the matched template structure; and
storing the index in an index database.

10. The computer-readable non-transitory storage medium of claim 9, wherein the updated template comprises the fields arranged in the matched template structure.

11. The computer-readable non-transitory storage medium of claim 9, the updating the template including increasing a template version number.

12. The computer-readable non-transitory storage medium of claim 11, wherein the encoded instructions, when executed by the processor, cause the processor to accomplish another step of:
generating an index name for the index, the index name comprising a combination of a date, the document type, the template version number.

13. The computer-readable non-transitory storage medium of claim 9, the updating the template by matching the template structure to the document structure comprising any combination of:
adding one or more additional fields in the document structure to the template structure; and
moving one or more fields in the template structure to match the document structure.

14. The computer-readable non-transitory storage medium of claim 9, wherein the document data is formatted in field-value pairs, the generating the index from the updated template with the document data comprising:
generating the index by copying into the index the fields from the updated template arranged in the matched template structure; and
inputting values from the document data into associated fields in the index.

15. The computer-readable non-transitory storage medium of claim 9, wherein the encoded instructions, when executed by the processor, cause the processor to accomplish additional steps of:
responsive to updating the template, identifying one or more additional indices in the index database that match the document type, each of the additional indices comprising index data arranged in the template structure;
for each of the additional indices, generating a subsequent index from the additional index with the updated template, wherein the subsequent index has the index data from the additional index arranged in the matched template structure from the updated template; and
storing the subsequent indices in the index database.

16. The computer-readable non-transitory storage medium of claim 15, wherein the encoded instructions, when executed by the processor, cause the processor to accomplish another step of:
deleting the additional indices from the index database upon storing of the subsequent indices.

17. A method comprising:
storing a first index for a document in an index database, wherein the first index comprises a first index data stored in fields arranged in a template structure, the first index generated according to a template comprising the fields arranged in the template structure;
receiving, at an online system, an updated document comprising document data arranged in a document structure;
determining whether the document structure matches the template structure;
responsive to determining that the document structure does not match the template structure, updating the template by matching the template structure to the document structure, wherein the updated template comprises the fields arranged in the matched template structure;
generating a second index from the updated template with the document data, wherein the second index comprises the document data from the updated document arranged in the matched template structure; and
storing the second index in the index database.

18. The method of claim 17, further comprising:
responsive to updating the template, identifying one or more additional indices in the index database that match the document type, each of the additional indices comprising index data arranged in the template structure;
for each of the additional indices, generating a subsequent index from the additional index with the updated template, wherein the subsequent index has the index data from the additional index arranged in the matched template structure from the updated template; and
storing the subsequent indices in the index database.

19. The method of claim 17, further comprising:
wherein the first index has a first date of generation;
responsive to determining that the document structure matches the template structure, determining whether the first date is outside of an update interval;
responsive to determining that the first date is outside of the update interval, generating a third index from the template with the document data, wherein the third index comprises the document data from the updated document arranged in the template structure; and
storing the third index with a third date of generation in the index database.

20. The method of claim 19, further comprising:
responsive to determining that the first date is not outside of the update interval, modifying the first index with the document data from the updated document arranged in the template structure; and
storing the modified first index in the index database.

\* \* \* \* \*